United States Patent [19]

DiMaggio et al.

[11] Patent Number: 4,840,253

[45] Date of Patent: Jun. 20, 1989

[54] METHOD AND APPARATUS FOR SERVING AND DISPLAYING FOOD

[76] Inventors: Joseph T. DiMaggio; Marina A. DeMaggio, both of 479 Valencia Dr., South San Francisco, Calif. 94080

[21] Appl. No.: 932,452

[22] Filed: Nov. 18, 1986

[51] Int. Cl.$^4$ ............................................. B65G 53/02
[52] U.S. Cl. ....................................... 186/49; 104/73; 406/106
[58] Field of Search ............................ 186/26, 38, 49; 406/106; 272/32; 273/140; 198/377; 104/73, 59

[56] References Cited

U.S. PATENT DOCUMENTS

| | | | |
|---|---|---|---|
| 724,040 | 3/1903 | Pusterla | 104/73 |
| 1,031,510 | 7/1912 | Bail | 272/32 |
| 1,859,267 | 5/1932 | Kurz | 104/73 |
| 4,560,032 | 12/1985 | Imanaka | 186/38 |

Primary Examiner—F. J. Bartuska
Attorney, Agent, or Firm—Limbach, Limbach & Sutton

[57] ABSTRACT

A method and apparatus for serving and displaying food is disclosed wherein nonconnected food carriers are circulated in continuous watercourse. The carriers have a circular outer perimeter and are disposed within the watercourse in a staggered arrangement. The invention further includes use of a water current so as to cause simultaneous rotation of the carriers along a vertical axis and horizontally propelling the carriers along the watercourse in a predetermined direction.

2 Claims, 1 Drawing Sheet

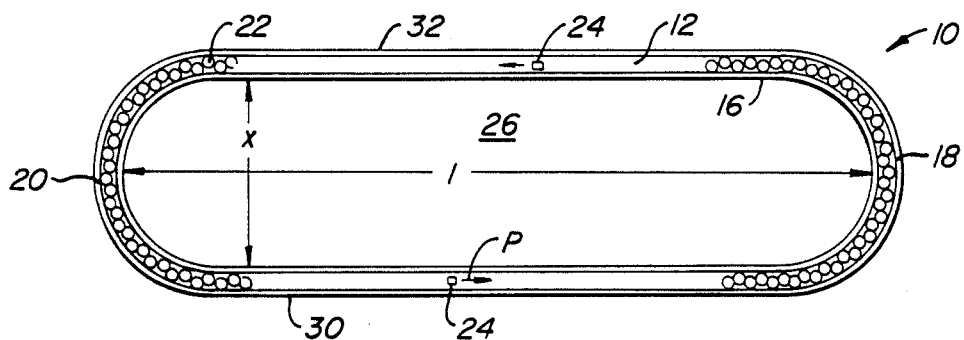
FIG._1.
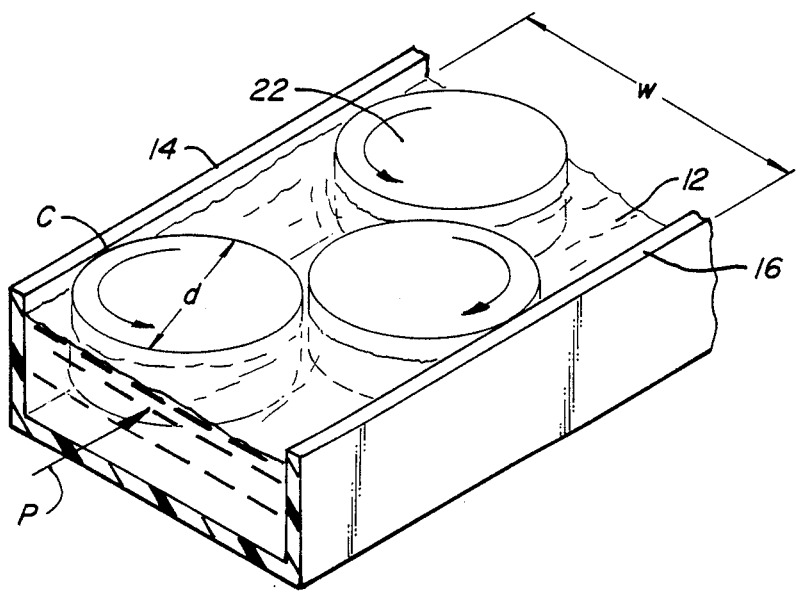
FIG._2.
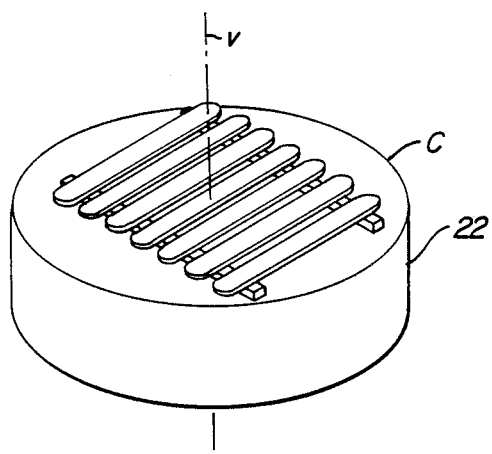
FIG._3.

METHOD AND APPARATUS FOR SERVING AND DISPLAYING FOOD

DESCRIPTION

1. Technical Field

The present invention relates generally to the field of food display and service. More specifically, the present invention relates to a method and apparatus for continuously and automatically serving and displaying food.

2. Background of the Invention

Numerous methods and devices for automatically serving and displaying food are known. The history of such automatic food conveyance systems has been outlined in U.S. Pat. No. 4,450,032 to Imanaka. These include the traditional automatic service systems in which individual food orders or dirty dishes are transmitted between kitchen and restaurant patron via a continuous conveyer chain (U.S. Pat. No. 1,411,432 to Henderson). Another variety of automatic food service systems is the type in which food is prepared and placed upon a device which circulates the food for the patron's viewing and selection. Such a device is disclosed in U.S. Pat. No. 3,901,355 to Shirashi which circulates food or display and selection via an endless conveyer mounted in a circular path of travel, the outer perimeter of which are seated the patrons.

The concept of displaying food along a circular path of travel before a group of patrons has enjoyed much success in Japanese restaurants serving sushi, a Japanese dish generally comprising small bite-size arrangements of vinegar rice and fish or other delicacies, usually served at room temperature. In the traditional sushi "bar" a patron generally sits at a counter and places orders of various sushi dishes directly to a sushi chef on the other side of the counter who immediately prepares the order right before the patron. A single sushi order is quite small and a single meal is generally comprised of many orders of sushi, thus requiring constant interaction between patron and sushi chef. As can be appreciated, a single sushi chef can only service a small number of patrons under these circumstances.

With the introduction of automatic food display and service systems into restaurants serving sushi, the number of patrons which a sushi chef can service has been greatly increased. With the aid of such systems, the sushi chef merely prepares a variety of sushi dishes and places them onto the automatic device. The device then circulates the various dishes before the patrons who select the dish of their choice by picking it up off of the device. The vacancy created by the patron's selection is then filled by the sushi chef who merely places another dish in the position.

One such food display system is disclosed in Imanaka in which a food preparation area is surrounded by a continuous watercourse. A continuous chain of small food carriers having the shape of boats arranged in tandem are disposed in the watercourse. The bow of each boat is physically attached to the stern of another boat via a chain or other interconnecting member. Food orders are placed on the boats which are circulated around the watercourse via a water current. Patrons seated around the watercourse make their selection by removing food orders from the boats as they pass.

As can be appreciated, the device of Imanaka suffers from the disadvantage that the boat-shaped food carriers are physically linked to one other. Thus, removal one boat in the chain, for repair or other purposes, requires that the boat chain be severed and operation of the device cease.

The use of a continuous watercourse to circulate objects is not novel to the area of food display and selection. U.S. Pat. No. 4,165,075 to Popovich discloses the use of such a watercourse in a fishing game device. In the device of Popovich, nonconnected, free-floating discs containing ferromagnetic material float on the surface of water in a linear arrangement and are circulated in a continuous water channel. The discs are retrieved by fishing poles having magnets attached to the ends of their lines. As disclosed in Imanaka at column 1, lines 56-63, a system such as that disclosed in Popovich has been used to display food in a bar in Japan. Although such a system of nonconnected floating disc-shaped food carrier solves the problem of disruption due to removal of a carrier as in the Imanaka device, it has been found that after only a short time of operation, the floating discs become damaged due to collisions and jamming at the corners of the watercourse.

An object of the present invention is to provide a method for serving and displaying food wherein nonconnected food carries are circulated in a continuous pathway in a predetermined direction.

It is also an object of the present invention to provide a method for serving and displaying food wherein food carriers are made to rotate so as to display the entire carrier while travelling in a predetermined direction.

It is a further object of the present invention to provide a method for serving and displaying food wherein food carriers are circulated in a continuous watercourse.

It is another object of the present invention to provide an apparatus for serving and displaying food wherein food is circulated on nonconnected food carriers in a continuous pathway in a predetermined direction.

It is yet another object of the present invention to provide an apparatus for serving and displaying food wherein food carriers are made to rotate so as to display the entire carrier while traveling in a predetermined direction.

It is a further object of the present invention to provide an apparatus for serving and displaying food wherein food is circulated on food carriers floating in a continuous watercourse in a predetermined direction.

SUMMARY OF THE INVENTION

The present invention provides a method and apparatus for serving and displaying food. The method comprises the steps of providing a continuous pathway having a predetermined width, providing a plurality of food carriers having a circular outer periphery disposed within the pathway in a staggered arrangement. The method further includes the step of simultaneously rotating the carriers along a vertical axis and horizontally propelling the carriers along the pathway in a predetermined direction.

The apparatus of the present invention comprises a continuous pathway having a predetermined width, a plurality of food carriers having a circular outer periphery disposed within the pathway. The carriers are disposed within the pathway in a staggered arrangement. The carriers further have an outer diameter which is less than the width of the pathway but greater than one-half the width of the pathway. The apparatus also includes means for simultaneously rotating the carriers along a vertical axis and horizontally propelling the carriers along the watercourse in a predetermined direction.

In the preferred embodiment, the pathway is a watercourse having rounded ends and is defined by two parallel vertical walls. The entire system is powered by a water current which causes substantially all of the carriers to physically contact their adjacent carriers at their respective outer peripheries and to physically contact one of the parallel vertical walls of the water course. The water current also causes substantially every other carrier in the watercourse to rotate along a vertical axis in a clockwise direction while substantially all of the remaining carriers rotate along the vertical axis in a counterclockwise direction.

BRIEF DESCRIPTION OF THE DRAWINGS

FIG. 1 is a top plan view of the apparatus of the present invention.

FIG. 2 is a perspective view of an enlarged portion of the apparatus shown in FIG. 1 illustrating the arrangement and direction of motion of food carriers 22 in pathway 12.

FIG. 3 is a perspective view of a single food carrier 22.

DETAILED DESCRIPTION OF THE DRAWINGS

Referring to FIG. 1, the apparatus of the present invention is shown generally as 10. The apparatus comprises a continuous pathway 12 having a width "w" and two parallel vertical walls, outer vertical wall 14 and inner vertical wall 16. In the drawings, outer vertical wall 14 defines the outer perimeter and inner vertical wall 16 defines the inner perimeter of pathway 12. Ends 18 and 20 of pathway are rounded. As shown in FIGS. 1 and 2, a plurality of food carriers 22 is disposed within pathway 12 in a staggered arrangement.

Each carrier 22 has a circular outer periphery "c" and an outer diameter "d" which is less than width "w" so as to fit within pathway 12. Outer diameter "d" is also greater than one-half of width "w" so that no two carriers can pass through pathway 12 side by side. As shown in FIGS. 1 and 2, the staggered arrangement of carriers 22 disposed within pathway 12 results in every other carrier in the arrangement being in close proximity to outer vertical wall 14 and the remaining carriers being in close proximity to inner vertical wall 16.

The apparatus further includes means 24 for simultaneously rotating carriers 22 along a vertical axis "v" and horizontally propelling the carriers along pathway 12 in a predetermined direction "p". When carriers 22 are propelled along pathway 12 in direction "p", substantially all of the carriers should physically contact their adjacent carriers at their respective outer peripheries "c" and contact either outer vertical wall 14 or inner vertical wall 16 of pathway 12. As can be appreciated, this simultaneous rotation of carriers 22 along vertical axis "v" and along predetermined direction "p", when the outer perimeters of the carriers are in physical contact with their most proximal vertical wall and adjacent carriers, creates a gear-in-motion type effect where every other carrier in the arrangement rotates clockwise while the remaining carriers rotate counterclockwise.

As can be appreciated, it is advantageous, but not mandatory, that the total number of carriers 22 are sufficient to provide a substantially continuous arrangement of carriers within pathway 12. However, it is important to note that carriers 22 should not be jammed within pathway 12 so that their ability to rotate or move along predetermined direction "p" is unduly hindered. In this regard, it has been found that a slight gap between carriers is optimal.

The simultaneous propulsion and rotation feature of the present invention offers significant advantageous over prior art food conveyance systems in that not only is food delivered and displayed to the patron, but the patron may view the food order from all sides by virtue of the rotation. Further because food carriers 22 are not connected to one another, removal of a single carrier will not cause the entire system to cease operation.

In the preferred embodiment, pathway 12 comprises a watercourse and carriers 22 have the ability to float in the watercourse. In this embodiment, means 24 comprises means for creating a water current in predetermined direction "p" such as a water pump or a plurality of water pumps as shown in FIG. 1.

The preferred embodiment also includes a service area 26 surrounded by inner vertical wall 16 of pathway 12. In operation, a chef prepares food orders within service area 26 and places them on the upper surface 28 of carriers 22, even when in motion. The food orders are sent along direction "p" and rotate about vertical axis "v" so that patrons seated on the opposite side of pathway 12, i.e., that portion bound by vertical wall 14, may view the orders as they rotate past and choose their selections by removing the order from the food carrier as they travel by.

DESCRIPTION OF THE PREFERRED EMBODIMENT

An apparatus of the watercourse variety was constructed in accordance with the present invention. Continuous pathway 12 was constructed of stainless steel and had an oblong configuration with relatively straight parallel sides 30 and 32 and semicircular ends 18 and 20. Width "w" of pathway 12 was 10.5 inches. Service area 26 had a width "x" of 9.5 feet and a length "l" of 39 feet.

Food carriers 22 were comprised of laminated plastic and were configured as short cylinders having a closed end. All carriers had an outer diameter of 8.75 inches and weighed between 10.38 to 11.5 ounces. Two water pumps 24 were used as the means for rotating and propelling the carriers. One was placed at about the center of each of the straight parallel sides 30 and 32 of pathway 12. Although the pumps used were not identical, both were obtained from Little Giant Pump Company (Model No. 3E12N, Cat. No. 503103, 115 vac., 3.2 amps, 60 Hz., 1 pH; and Model No. 2E38N, Cat. No. 502203, 115 vac., 1.7 amps, 60 Hz., 1 pH).

Water was added to the pathway to a height of approximately 4 to 5 inches. One hundred and one of the above-described food carriers were placed into the water contained in pathway 12 in a staggered arrangement such that substantially every other carrier in the arrangement was positioned closer to inner vertical wall 16 than to outer vertical wall 14. The remaining carriers were positioned closer to outer vertical wall 14 than to inner vertical wall 16. The dimensions of the pathway and carriers resulted in slight gaps between carriers when staggeredly arranged. When the carriers were shoved together so as to eliminate the gaps therebetween, a space of approximately 4 inches was observed between the first and last carrier in the arrangement.

Food orders were placed onto the upper surface of food carriers 22 and the water pumps were started. The pumps caused a water current sufficient to propel the carriers along predetermined direction "p" in pathway 12. The water current also caused the carrier to rotate about vertical axis "v" in such a way that substantially every other carrier in the arrangement rotated in a clockwise direction while the remaining carriers rotated in a counterclockwise direction while being propelled along predetermined direction "p". During this movement, the outer perimeters of substantially all of the carriers were in physical contact with their two neighboring carriers and the vertical wall of pathway 12 which was closest to it.

It was found that the carriers preserved their staggered positions quite well when travelling along the straight portions of pathway 12 but intended to become disarrayed and sometimes even linearly arranged when travelling through rounded ends 18 and 20. It was also found that when carriers 22 are linearly arranged, they do not rotate well and skid along their most proximal vertical wall. However, once the carriers passed the rounded portions, they repositioned themselves and regained their optimum staggered positions and their rotational mobility.

As can be appreciated, the utility of the present invention is not confined to food display and selection. It can be used to display a wide variety of objects. Thus, although the foregoing invention has been described in some detail by way of illustration for purposes of clarity of understanding, it will be understood that numerous modifications may be practiced within the spirit and scope of the appended claims.

We claim:

1. An apparatus for serving and displaying food comprising:

a continuous watercourse pathway having a predetermined width and defined by an inner continuous, stationary vertical wall and an outer continuous, stationary vertical wall, said inner and outer vertical walls being spaced apart and substantially parallel to one another in an oblong configuration and with two rounded ends, said watercourse pathway confining water at a continuous horizontal level;

a plurality of food carriers floatable in water, each carrier having a circular outer periphery and an outer diameter which is less than the width of said pathway and greater than one-half the width of said pathway, wherein said carriers are disposed sequentially within said pathway and adjacent to one another in a substantially staggered arrangement such that the outer peripheries of substantially every other carrier in said arrangement is in close proximity to said outer vertical wall and the outer peripheries of substantially all of the other of said carriers are in close proximity to said inner vertical wall; the length of said pathway and the number and diameters of said carriers being such that the total accumulated spacing between said carriers around said watercourse pathway is less than the smallest carrier diameter; and means for circulating water around said watercourse pathway for horizontally propelling said carriers along said pathway in a predetermined direction such that said carriers are in contact only with one another and with said inner and outer vertical walls, wherein during propelling of said carriers by said means for circulating water substantially every carrier physically contacts its adjacent carriers at their respective outer peripheries and contacts one of said vertical walls whereby substantially all of said carriers rotate simultaneous about their respective vertical axes with adjacent carriers rotating in opposite directions.

2. A method for serving and displaying food comprising:

providing a continuous watercourse pathway having a predetermined width and defined by an inner continuous, stationary vertical wall and an outer continuous, stationary vertical wall, said inner and outer vertical walls being spaced apart and substantially parallel to one another in an oblong configuration and with two rounded ends, said watercourse pathway confining water at a continuous horizontal level;

providing a plurality of food carriers floatable in water, each carrier having a circular outer periphery and an outer diameter which is less than the width of said pathway and greater than one-half the width of said pathway;

disposing said carriers sequentially within said pathway and adjacent to one another in a substantially staggered arrangement such that the outer peripheries of substantially every other carrier in said arrangement is in close proximity to said outer vertical wall and the outer peripheries of substantially all of the other of said carriers are in close proximity to said inner vertical wall, and such that the total accumulated spacing between said carriers around said watercourse pathway is less than the smallest carrier diameter; and circulating water around said watercourse pathway for horizontally propelling said carriers along said pathway in a predetermined direction such that said carriers are in contact only with one another and with said inner and outer vertical walls, wherein during propelling of said carriers by circulating water substantially every carrier physically contacts its adjacent carriers at their respective outer peripheries and contacts one of said vertical walls whereby substantially all of said carriers rotate simultaneously about their respective vertical axes with adjacent carriers rotating in opposite directions.

* * * * *

UNITED STATES PATENT AND TRADEMARK OFFICE
CERTIFICATE OF CORRECTION

PATENT NO. : 4,840,253

DATED : June 20, 1989

INVENTOR(S) : Joseph T. DiMaggio
Marina A. DeMaggio

It is certified that error appears in the above - identified patent and that said Letters Patent is hereby corrected as shown below:

On the title page, item [76]:

Please correct the inventors name from "Marina A. DeMaggio" to "Marina A. DiMaggio.

Signed and Sealed this

Sixteenth Day of October, 1990

Attest:

HARRY F. MANBECK, JR.

*Attesting Officer*  *Commissioner of Patents and Trademarks*